Oct. 6, 1964        J. C. SINEX        3,151,403
SELF-TEACHING DEVICE
Filed Dec. 12, 1962        2 Sheets-Sheet 1

*INVENTOR*
JOHN CLARKE SINEX

BY *G. R. Gugger*

*AGENT*

Oct. 6, 1964 J. C. SINEX 3,151,403
SELF-TEACHING DEVICE
Filed Dec. 12, 1962 2 Sheets-Sheet 2

United States Patent Office 3,151,403
Patented Oct. 6, 1964

3,151,403
SELF-TEACHING DEVICE
John Clarke Sinex, Binghamton, N.Y., assignor to International Business Machines Corporation, New York, N.Y., a corporation of New York
Filed Dec. 12, 1962, Ser. No. 244,047
3 Claims. (Cl. 35—9)

This invention relates to a self-teaching device and more particularly to a machine processable tabulating card for use in recording answers to multiple choice examination questions.

Self-teaching devices have been provided in the past whereby the student either visually or by a sense of feel could ascertain whether or not the answer he selected is the correct one. This enables the ultimate selection of the correct answer and also the recording of the total number of incorrect answers selected prior to obtaining the correct answer. Heretofore, self-teaching answer sheets of the type which required only the use of a pencil or stylus of some sort have been in the form of relatively thick multi-ply sheet structures which could not be machine processed. In recording on these sheet structures, the stylus would penetrate part way through the sheet when an incorrect answer was encountered and it would penetrate part way to a little greater depth in the sheet when a correct answer was encountered. As a result, the success of such self-teaching sheet structures required a high degree of sensitivity or response on the part of the student in order to detect the difference between a punched correct answer and a punched incorrect answer.

In an attempt to improve on self-teaching answer sheet structures of the type referred to above, the present invention makes use of the well-known single ply machine processable tabulating card. The card carries the usual printed format of program questions and multiple choice answers. One end of the card is provided with three scored foldable sections. The first section contains prescored punching positions relating to the multiple choice answers with the next adjoining section being provided with one thru perforation relating to the correct answer. The third section contains the same arrangement of prescored punching positions as the first section. By folding the scored sections in accordion fashion and fastening them together, there is provided a self-teaching card which is much simpler for the student to use and one which gives a more positive and receptive indication of whether the student's attempt resulted in the correct answer or in an incorrect answer.

In the use of the present device with a stylus, pencil, or the like, an incorrect answer selection will result in the unpunched portion of the middle folded section substantially blocking the stylus to prevent penetration through the card whereas, if a correct answer selection is made, the perforation in the middle section is encountered and the stylus may be easily pushed through the card with the prescored punching positions in the other two folded sections offering very little resistance. Since in making the selections, the stylus either does or does not easily penetrate through the entire folded portion of the card, the student is provided with a much more receptive indication of whether his selection was right or wrong.

Accordingly, a principal object of the present invention is to provide an improved device of the character referred to which is formed from a single ply machine processable record.

A further object of the present invention is to provide a self-teaching tabulating card device which affords the student a more positive and receptive indication of whether an answer attempt is correct or incorrect.

A still further object of the present invention is to provide a machine processable record having prescored and prepunched sections which may be folded and fastened in superposed relationship to provide an improved self-teaching device.

The foregoing and other objects, features and advantages of the invention will be apparent from the following more particular description of preferred embodiments of the invention, as illustrated in the accompanying drawings.

Figure 1:
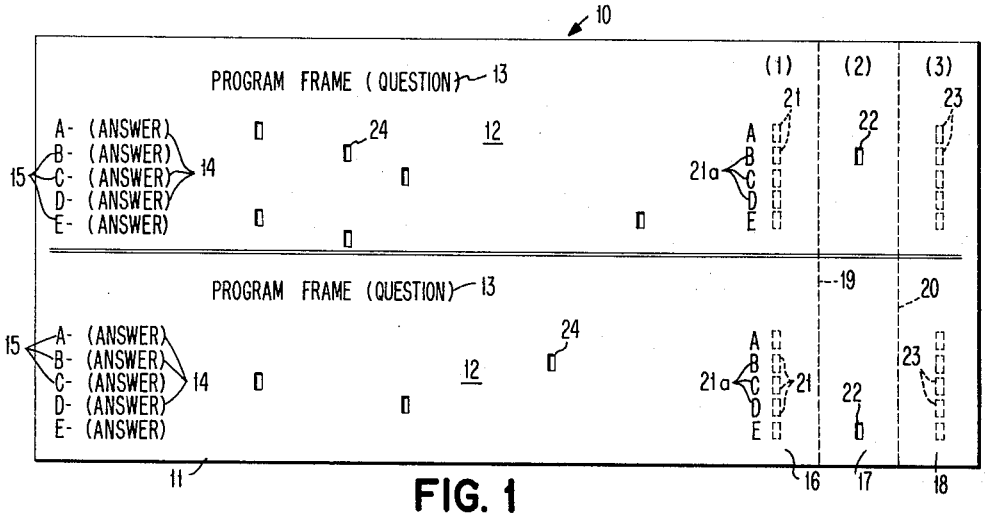
FIG. 1 is a plan view of a single ply tabulating card ready for folding to form a device embodying one form of my invention.

Referring to FIG. 1, 10 indicates an answer card embodying a preferred form of my device for recording answers to multiple choice type of examination questions. The device 10 is preferably formed of a single sheet of card stock 11 having the general rectangular dimensions of the well-known tabulating card and having a thickness of between .007 to .009 inch which is the range of card stock thickness which can be satisfactorily handled in tabulating card processing machines.

Using the concepts of programmed learning, one or more program frames 12 are arranged on the card and each frame is suitably imprinted with a program frame question 13 and multiple answers 14 to the question as illustrated. Answer indicating letters 15 are provided to separately identify each of the multiple answers. The multiple answers in each frame are shown arranged beneath their related program questions in vertical rows equally spaced apart.

Disposed between the program frame portions 12 and the right-hand edge of the card are three adjacent vertical sections or columns 16, 17 and 18 which are divided by the two scored folding lines 19 and 20. These sections extend from the top to the bottom of the card and, if desired, identifications such as (1), (2) and (3) may be imprinted at the top of the sections, as shown. The section 16 is provided with a plurality of prescored punching positions 21 arranged in a vertical row and which are punched by the student when selecting the multiple choice answers 14. Accordingly, a prescored punching position 21 is provided in horizontal alignment with each one of the multiple choice answers 14 and the punching positions are provided with indicating letters 21a which correspond to the related multiple choice answer. In the middle section 17, there is provided a thru-punching 22 for each program frame question 13, each punching 22 being in horizontal alignment with the multiple choice answer 14 which is the correct answer to the related question and with the prescored punching position 21 which relates to the correct answer. The end section 18 is provided with an arrangement of prescored punching positions 23 which is identical with the arrangement of prescored punching positions 21 in section 16.

In the form shown in FIG. 1, the self-teaching answer card 10 has the feature of being in the form of the well-known single ply machine processable tabulating card and, as such, it may be provided with data representing punchings 24 suitably disposed throughout the program frame portions of the card. Cards in this form may then be machine processed to identify a sequence of program steps which make up a course of study or to classify and sort the cards by student serial number, teacher serial number or school identification.

Figure 2:
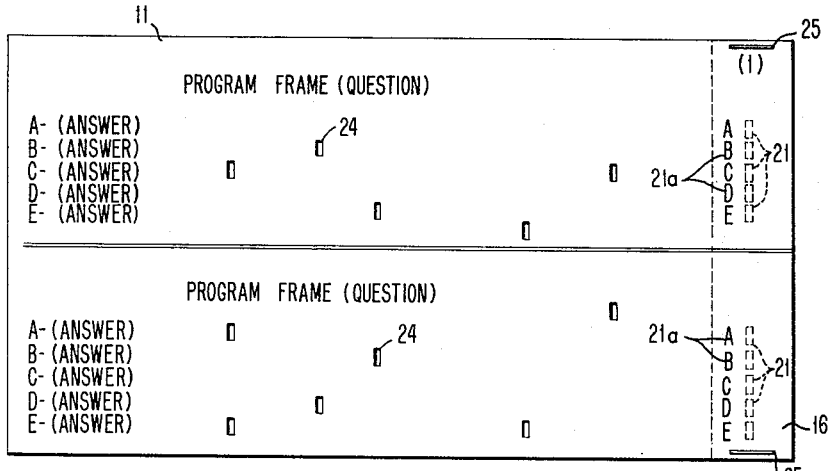
FIG. 2 is a plan view of the card of FIG. 1 with the prescored and prepunched sections folded and fastened in superposed relationship ready for use by the student.
Figure 3:
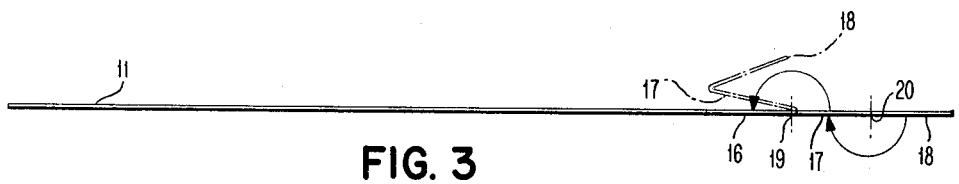
FIG. 3 is a front elevation view of the card in FIG. 1 illustrating the complete folding operation.
Figure 4:
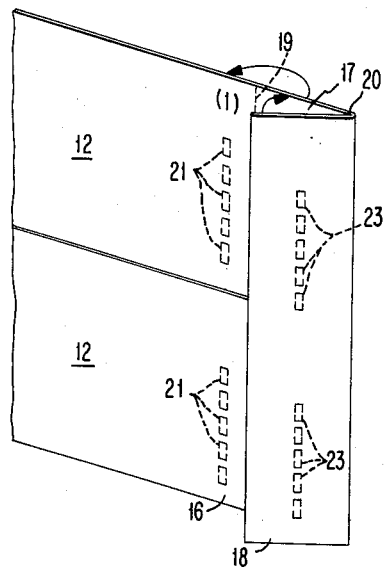
FIG. 4 is a perspective view of the card showing the first folding operation.
Figure 5:
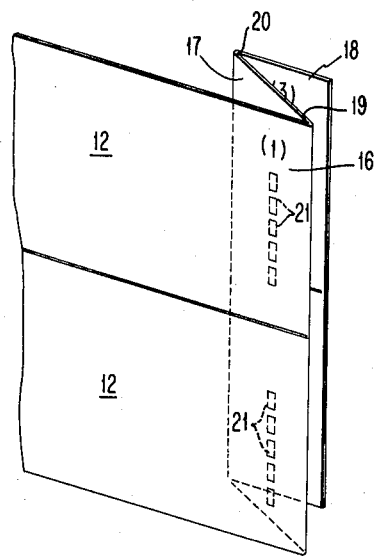
FIG. 5 is a perspective view of the card showing the second folding operation.

The answer card 10 is put in final form for distribution to the student by folding the sections 16, 17 and 18 in accordion fashion and then fastening them together so that the card is in the form shown in FIG. 2. FIGS. 3, 4 and 5 illustrate the manner in which the sections are folded and it can be seen that section 18 is folded over on top of the middle section 17 and then sections 17 and 18 folded underneath the section 16 so that the section 17 is between the other two. The prescored punching positions 21 in section 16 are in superposed alignment with the thru-punchings 22 in section 17 and the prescored punching positions 23 in section 18. The sections are suitably fastened together in this position by fasteners, such as the staples 25 shown in FIG. 2, or by gluing.

In using the answer card, the student reads the question, selects his answer and attempts to punch the corresponding prescored punching position 21 with a suitable stylus or the like. The prescored position 21 is easily penetrated and if the answer choice is correct the thru-punching 22 is encountered which allows the stylus to proceed easily on through the aligned prescored punching position 23 and out the backside of the card. If the answer choice is incorrect, the stylus will be blocked by the solid card material of section 17 beneath the selected prescored position 21 and the punching cannot be completed through the card without the exertion of undue pressure. Hence, it can be seen that the student will get immediate feedback on each answer attempt with a clear distinction between right and wrong. By folding the sections in accordion fashion, as shown, the student is prevented from seeing the correct answers in advance since the thru-punchings 22 are completely covered on both sides by the sections 16 and 18.

It may be pointed out that, in addition to the standard 80 column record card, fractional length cards such as 51 column or 66 column cards may be employed equally as well to provide the present tab card teaching device. Also, if desired, after use by the student the folded tab sections 17 and 18 may be loosened and separated from the remainder of the card by tearing along the score line 19. There is thus left a single ply record comprising the program frames 12 and section 16 which may be machine processed to grade, for example, the answer attempts recorded in section 16.

Figure 6:
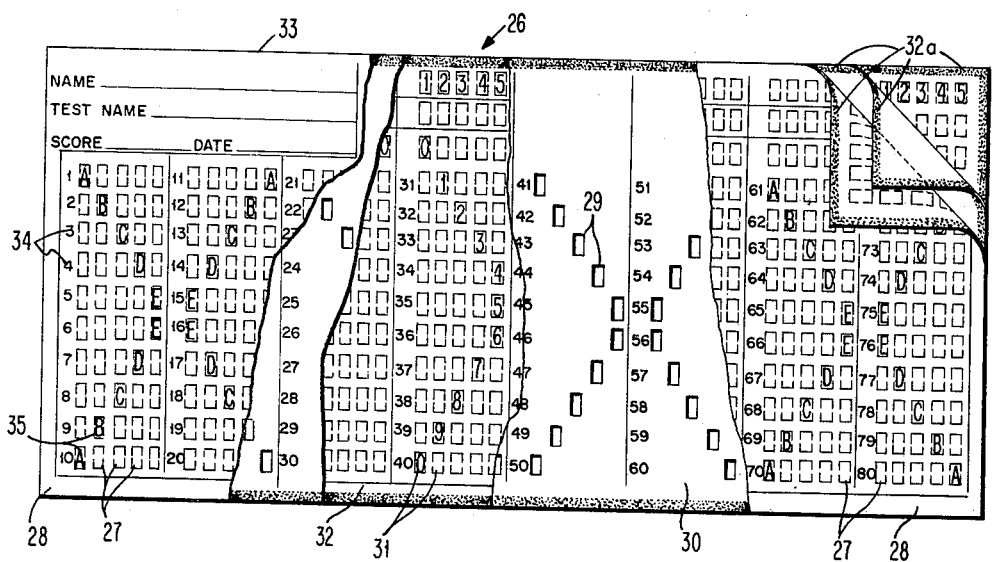
FIG. 6 is a plan view of a multi-ply tabulating card device embodying another form of my invention.

In FIG. 6, there is shown another embodiment of the present invention wherein instead of providing a single ply answer card having foldable tab sections a three-ply or three section answer card 26 is provided. In superposed alignment there are prescored punching positions 27 in the top ply 28 which correspond to the multiple choice answers, thru-punchings 29 in the middle ply 30 which correspond to the correct answers, and the back-up prescored punching positions 31 in the bottom ply 32. The three plies are suitably fastened together in superposed relationship, as shown, by adhesive means 32a or suitable staple fasteners. The top ply 28 is provided with a preprinted section 33 in which the student may write identifying information. The answer card 26 is punched by the student in the same fashion as the above-described folded tab card style and the student receives the same type of immediate feedback telling him whether his answer choice is right or wrong. This type of answer card is particularly useful where the questions and answers are in book form or are flashed on a screen. Horizontal columns of 5 prescored punching positions 27 are provided with preprinted identifying numbers 34 to associate each column with the related question. Each punching position 27 is preprinted with an identifying letter 35 to associate that punching position with the related multiple choice answer.

The present invention may be practiced, if desired, without the use of section 18 in the card 10 or the bottom ply 32 of the card 26. However, they are preferably used since they both function to mask the thru-punchings 22 and thus prevent the student from turning the device over and seeing the correct answer before the correct answer is recorded. Also, it may be pointed out that the present teaching devices 10 and 26 are adapted to be used with the well-known portable punching boards of the type shown and described in U.S. Patent 3,007,620 which issued on November 7, 1961.

While the invention has been particularly shown and described with reference to preferred embodiments thereof, it will be understood by those skilled in the art that various changes in form and details may be made therein without departing from the spirit and scope of the invention.

What is claimed is:

1. A self teaching device for recording answers to multiple choice questions comprising:
   a record card having at least one question and a plurality of related multiple choice answers including an incorrect answer and a correct answer indicated thereon;
   a first section of said card provided with a plurality of prescored punching positions corresponding to said multiple answers;
   a second section of said card foldably connected to said first section and provided with a thru-punching corresponding to said correct answer;
   a third section of said card foldably connected to said second section and provided with a plurality of prescored punching positions corresponding to said multiple answers; and
   means fastening said sections in folded superposed relationship with said second section enclosed between said first and third card sections.

2. A self teaching device for recording answers to multiple choice questions comprising:
   a record card having at least one question and a vertical row of related multiple choice answers including an incorrect answer and a correct answer indicated thereon;
   a first section of said card opposite said question and answers and provided with a vertical row of prescored punching positions corresponding to said multiple answers with each prescored position in horizontal alignment with the answer it corresponds to;
   a second section of said card foldably connected to said first section and provided with a thru-punching corresponding to said correct answer and in horizontal alignment therewith;
   a third section of said card foldably connected to said second section and provided with a vertical row of prescored punching positions arranged in the same fashion as the prescored positions in said first section; and
   means fastening said sections in folded superposed relationship with said second section enclosed between said first and third card sections and with corresponding prescored punching positions in said first and third card sections in registry with each other and with the thru-punching in said second card section.

3. A self teaching device for recording answers to multiple choice questions comprising:
   a record card having a first section, a second section and a third section fastened in superposed relationship with said second section enclosed between said first and third sections;
   a plurality of prescored punching positions disposed in said first section which correspond to correct and incorrect answers to said multiple choice questions;

a plurality of thru-punchings disposed in said second section which correspond to the correct answers to said multiple choice questions; and a plurality of prescored punching positions disposed in said third section which also correspond to said correct and incorrect answers to said multiple choice questions;

the corresponding prescored punching positions in said first and third sections being in registry with each other and with the thru-punchings in said second section.

References Cited in the file of this patent

UNITED STATES PATENTS

| | | |
|---|---|---|
| 2,080,150 | Peterson et al. | May 11, 1937 |
| 2,540,363 | Wistar | Feb. 6, 1951 |
| 2,618,866 | Adams | Nov. 25, 1952 |
| 2,976,620 | Schonning | Mar. 28, 1961 |